United States Patent [19]

Gokay

[11] Patent Number: 5,778,020
[45] Date of Patent: Jul. 7, 1998

[54] ND: YAG LASER PUMP HEAD

[75] Inventor: M. Cem Gokay, Centerville, Ohio

[73] Assignee: CJ Laser, Inc., Dayton, Ohio

[21] Appl. No.: 739,805

[22] Filed: Oct. 30, 1996

Related U.S. Application Data

[60] Provisional application No. 60/017,832, Jun. 4, 1996.

[51] Int. Cl.$^6$ ............................................................ H01S 3/091
[52] U.S. Cl. ................................. 372/75; 372/39; 372/40; 372/69; 372/70; 372/72
[58] Field of Search .................................... 372/7, 39, 40, 372/66, 68, 69, 70, 72, 75, 92, 98, 109

[56] References Cited

U.S. PATENT DOCUMENTS

| | | | |
|---|---|---|---|
| 3,388,314 | 6/1968 | Gould | 321/69 |
| 3,562,662 | 2/1971 | Gould et al. | 331/94.5 |
| 3,576,500 | 4/1971 | Gould et al. | 331/94.5 |
| 3,586,998 | 6/1971 | Gould | 331/94.5 |
| 4,053,845 | 10/1977 | Gould | 330/4.3 |
| 4,161,436 | 7/1979 | Gould | 204/157.1 |
| 4,704,583 | 11/1987 | Gould | 330/4.3 |
| 4,746,201 | 5/1988 | Gould | 356/112 X |
| 4,756,002 | 7/1988 | Ruggieri et al. | 372/70 |
| 4,969,155 | 11/1990 | Kahan | 372/70 |
| 5,033,058 | 7/1991 | Cabaret et al. | 372/75 |
| 5,040,187 | 8/1991 | Karpinski | 372/50 |
| 5,128,951 | 7/1992 | Karpinski | 372/50 |
| 5,140,607 | 8/1992 | Paiva | 372/70 |
| 5,200,972 | 4/1993 | Scheps | 372/69 |
| 5,216,688 | 6/1993 | Kortz et al. | 372/75 |
| 5,284,790 | 2/1994 | Karpinski | 437/129 |
| 5,291,504 | 3/1994 | Bournes | 372/34 |
| 5,311,535 | 5/1994 | Karpinski | 372/50 |
| 5,521,936 | 5/1996 | Irwin | 372/75 |
| 5,627,850 | 5/1997 | Irwin et al. | 372/43 |

FOREIGN PATENT DOCUMENTS

| | | | |
|---|---|---|---|
| 907110 | 8/1972 | Canada | 313/29 |
| 436380 | 4/1995 | European Pat. Off. | 372/75 X |
| 502670 | 8/1995 | European Pat. Off. | 372/75 X |
| 19515635 | 10/1996 | Germany | 372/75 X |

OTHER PUBLICATIONS

Vol. 2, LEOS '90, IEEE Lasers and Electro–Optics Society Annual Meeting Conference Proceedings, Nov. 4–9, 1990. 24–W average power at 0.537 μm from an externally frequency–doubled Q–switched diode–pumped Nd:YOS laser oscillator; Comaskey et al., Applied Optics, vol. 33, No. 27, pp. 6377–6381; Sep. 20, 1994.

High–average–power operation of a Q–switched diode–pumped holmium laser; Bowman et al., Optics Letters, vol. 18, No. 20, Oct. 15, 1993, pp. 1724–1726.

One Joule Output From a Diode–Array–Pumped Nd:YAG Laser with Side–Pumped Rod Geometrry, Kasinski et al., IEEE Journal of Quantum Electronics, vol. 28, No. 4, Apr. 1992, pp. 977–985.

*Primary Examiner*—Brian Healy
*Attorney, Agent, or Firm*—Biebel & French

[57] ABSTRACT

A transverse pumping system for a laser rod uses symmetrically arranged banks of laser diodes which create overlapping patterns of illumination inside the rod. Cooling is provided by a symmetrically constructed circulation system which directs a turbulent flow of cooling water against the laser rod and against a heat sink for the diode banks. Cooling water for the laser rod flows through a glass tube surrounding the rod. This enables the cooling water to perform an auxiliary function in focussing the illumination generated by the pumping diodes.

19 Claims, 19 Drawing Sheets

ND: YAG LASER PUMP HEAD

PRIOR PROVISIONAL APPLICATION

Applicant claims the benefit of the filing date of Provisional Application Ser. No. 60/017,832, filed Jun. 4, 1996, pending.

BACKGROUND OF THE INVENTION

This invention relates to laser heads which utilize Nd:YAG rods for converting incoherent light from laser diodes to coherent light in a side-pumped geometry. In such arrangements, one or more rows of diodes are placed or positioned along the length and parallel to the axis of the laser rod, and the rod is pumped in a direction perpendicular to that of the propagation in the laser resonator mode.

Side pumping, as it is known, has often been suggested for stimulating laser rods. However, the utilization of the diode energy in this mode has traditionally been accompanied by low efficiency, including the loss of the diode energy, for many reasons including the difficulties of exciting the rod core in the side pumping geometry. The divergence angle of the light from the diodes has increased the difficulties encountered in optimizing the light concentration at the laser rod core and has, in many instances, resulted in the application of complex optical interfaces which, themselves, contribute to losses in efficiency.

The cooling of the diode banks has also provided difficulties. Attempts to cool by heat sink alone and/or heat sink accompanied by thermoelectric cooling have, by and large, failed to consider the total wattage which must be dissipated and failed to consider the limited tolerances of such photoelectric diode banks to rising operating temperatures at the diodes. Heat sinks are effective only where there is provision for removal heat from the sink at a rate which equals the rate of heat input. Lack of temperature stability results in changes in diode operating modes, translating directly into decreased efficiency of the laser.

Attempts to pump laser rods simultaneously by a plurality of diode banks have resulted in the creation of isolated regions of excitement or hot spots within the laser rod. Such prior art banks have failed to create within the laser rod core a symmetry of excitement which approaches that achievable. Further, many such side pumping arrangements are incapable of high average power and/or continuous wave (CW) stimulation due to insufficient excitation and/or inadequate cooling arrangements for the diode banks.

Precision laser heads further suffer from a high cost of manufacture and production due to the use of a large number of dissimilar parts and the general lack of symmetry in the design of the head. Further, such designs are subject to thermal distortion of the lasing rod due to differential cooling. Some lack optimum orientation of the axis or axes of excitation with respect to the conventional "P" and "S" axes of polarization. Further, such arrangements lack the ability to be multiplexed in any arrangement in which two or more laser heads are axially stacked, with relatively rotated polarization axes.

SUMMARY OF THE INVENTION

This invention is directed to an Nd:YAG laser head in which a laser rod is side-pumped from a plurality of positions and which is capable of operating in the high average power continuous mode as well as in the pulsed mode. The head is symmetrically pumped and symmetrically cooled by components which are symmetrically configured and symmetrically arranged, so that to a large extent, interchangeable parts and components may be employed, particularly at each of the opposite ends of the laser rod.

An improved cooling arrangement is provided by means of which a large quantity of cooling water is directed to remove the heat from the diode banks and to remove the heat from the laser rod at an extremely low pressure drop accompanied by a relatively high velocity of movement of the cooling medium, such as water, thereby maintaining, at the critical points of heat exchange, a turbulent flow condition for maximum cooling efficiency.

The laser rod is supported coaxially within an enclosing cooling tube and is supported at its remote or opposite ends in such a way that a cone-shaped annulus is formed by which cooling fluid is injected at high velocity into a limited annular clearance space between the rod and its enclosing tube. A cone-shaped injector nozzle is formed which decreases in flow area with decreasing radius and causes a direct impingement of the cooling water against the outside of the laser rod within the predefined annulus. The cooling water is extracted at the opposite end of the rod with an identical structure.

The banks of pumping diodes have heat sinks which are cooled by direct impingement of a cooling medium, such as water, impacting an exposed side of the diode heat sink, under conditions of turbulent flow thereby minimizing the boundary layers and regions of flow stagnation.

A pumping geometry is provided in which diode banks are positioned in close and accurately defined proximity to the outer surface of an enclosing cooling tube. Four banks of diodes are provided in orthogonal relation comprising two perfectly diametrically opposed bank sets, with a second pair of diametrically opposed diode banks at respective 45° intervals. The inherent light bending characteristics of the cooling tube are utilized to carry the substantial and major portion of the admitted light into the core of the rod defined by four mutually overlapping patterns, which patterns coincide with a circular core of excitation within the rod.

Loss of light due to diode divergence is controlled by placing the diode banks in extremely close relation to the tube and by maintaining a minimum practical annulus between the inside surface of the tube and the rod so that at least 80% of the light from the diode overlaps at least 80% of the light from the orthogonally located diode banks at a core region of the laser rod.

It is therefore an important object of the invention to provide a Nd:YAG axially pumped laser head of increased efficiency, symmetrical design, having higher output, long life, being adapted for either continuous wave output or pulsed output, having lower production and manufacturing costs, and more uniform temperature stability.

It is a particular object of the invention to provide a system for cooling banks of pumping diodes for maintaining a relatively constant temperature, with controlled temperature rise, and for cooling a laser rod, providing highly efficient turbulent flow conditions while maintaining a relatively low pressure drop across the head.

A further object of the invention is the provision of a laser head having a symmetrical design of cooling passageways and passageway-defining parts and plates.

Another important object of the invention is the provision of a laser head, as outlined above, which is pumped from four orthogonal directions simultaneously by directing laser beams through the laser rod in which the angle of divergence of the beams is substantially within the diametric measurement of the rod and providing four uniformly overlapping light patterns in the core region of the rod.

A further object of the invention is the provision of a pumping diode cooling system establishing regions of turbulent flow against an exposed cooling surface of the diode heat sink.

A still further object of the invention is the provision of a system for cooling a laser rod by supporting the laser rod within a transparent tube and defining an annulus between the outer surface of the rod and the inside surface of the tube and injecting an annular stream of cooling water into such annulus at a velocity sufficient to maintain turbulent flow thereof throughout the length of such laser rod and extracting the water from such annulus at the opposite end.

Another object of the invention is the provision of a laser head, as outlined above, which is adapted to be multiplexed with one or more additional laser heads which are axially rotated with respect to each other.

Other objects and advantages of the invention will be apparent from the following description, the accompanying drawings and the appended claims.

DESCRIPTION OF PREFERRED EMBODIMENTS

Figure 1:
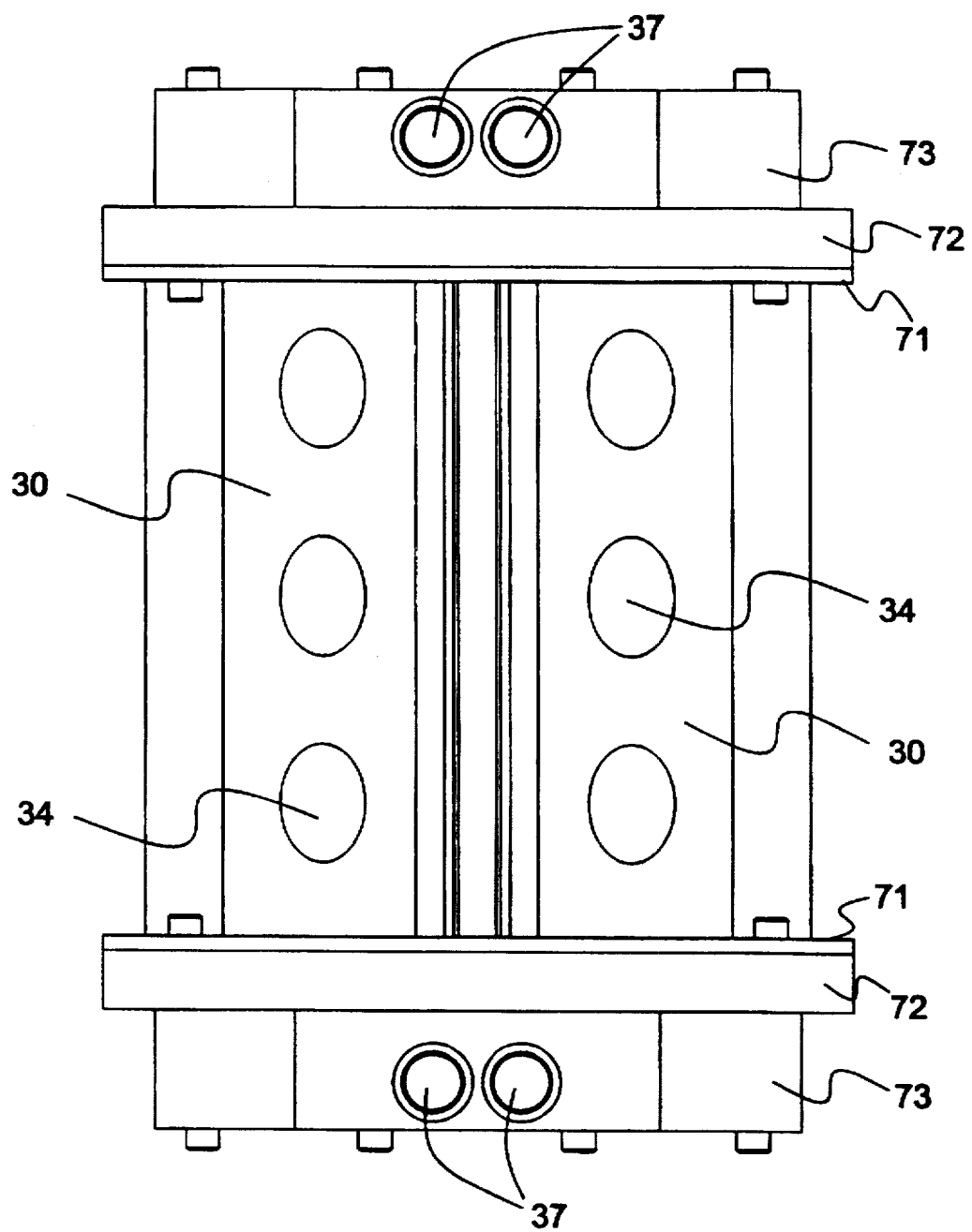
FIG. 1 is a plan view of a partially assembled laser pump head constructed according to this invention.
Figure 2:
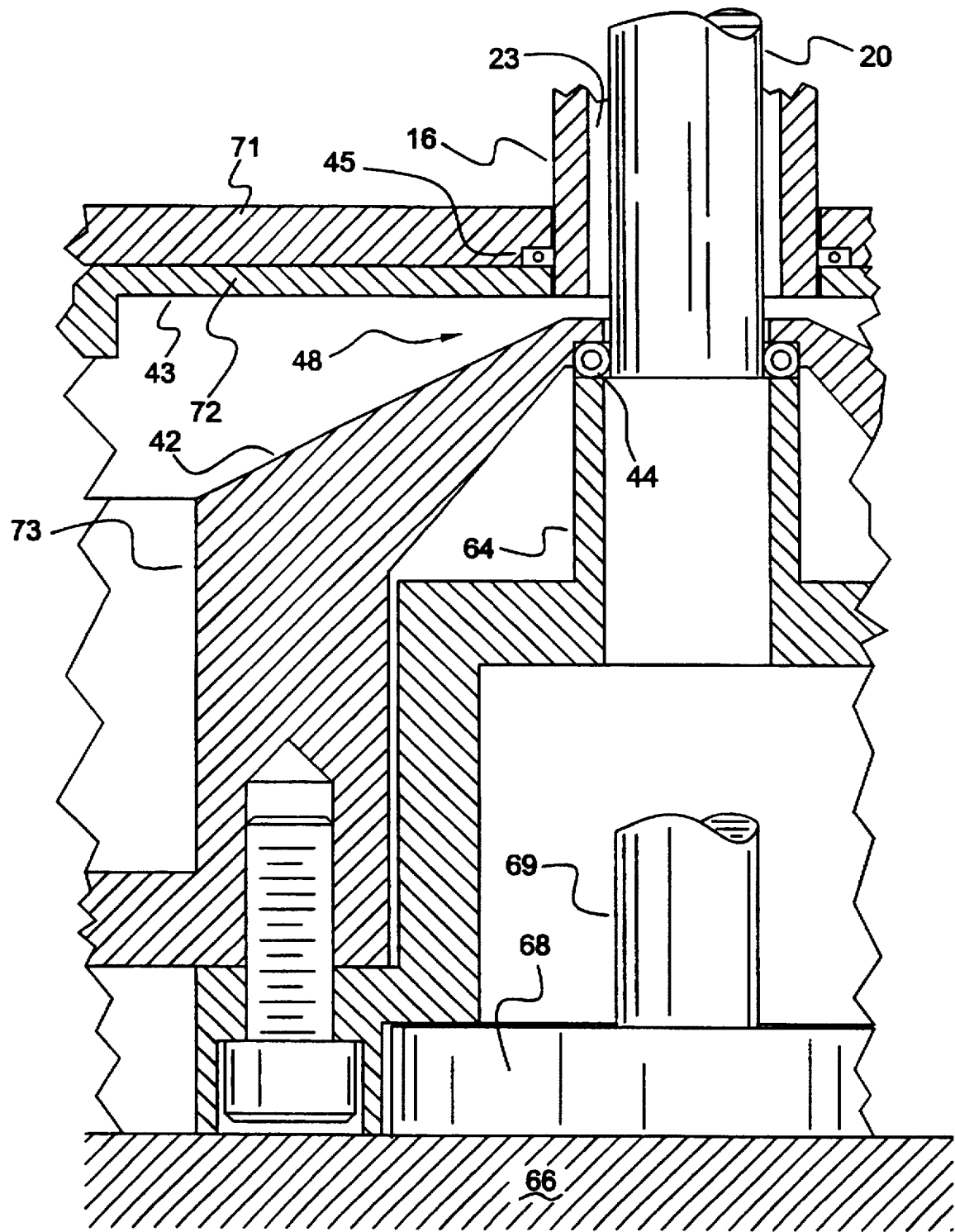
FIG. 2 is an enlarged fragmentary view, partially in crossection, of a partially assembled laser pump head positioned on a workbench and engaging a fixture which aligns the laser rod during installation.
Figure 12:
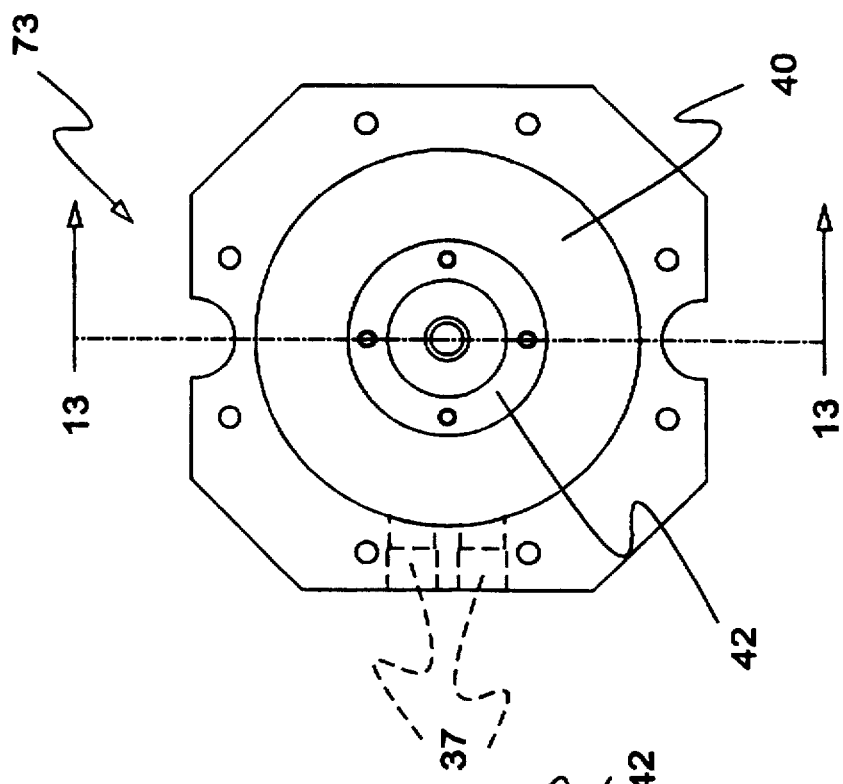
FIG. 12 is a front elevation view of a third cooler sealer plate showing the inside face thereof.
Figure 11:
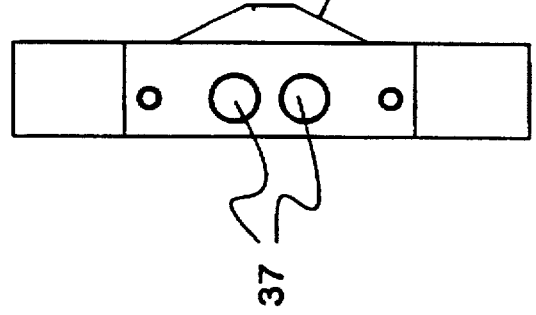
FIG. 11 is a side elevation view of a third cooler sealer plate.
Figure 15:
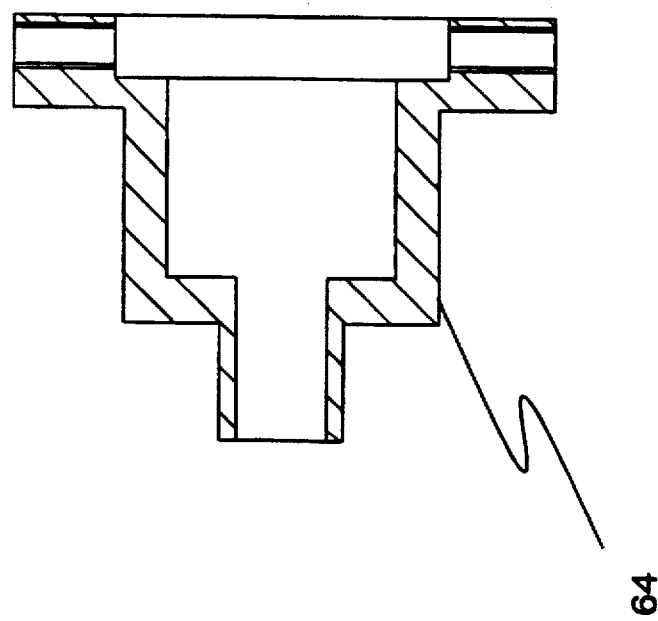
FIG. 15 is a crossection taken along lines 15—15 of FIG. 14.
Figure 14:
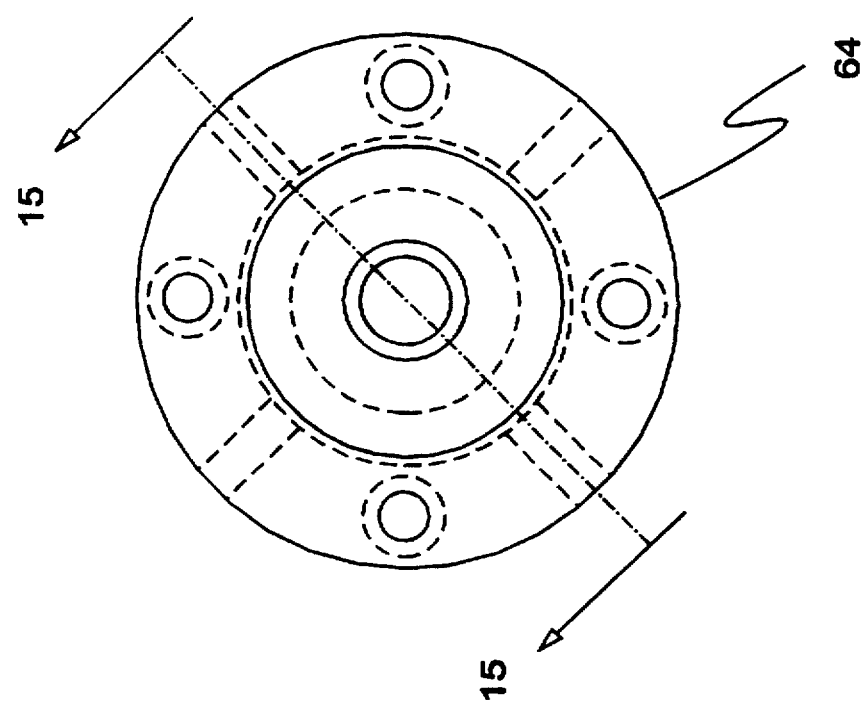
FIG. 14 is a front elevation view of a laser rod sealer plate.
Figure 16:
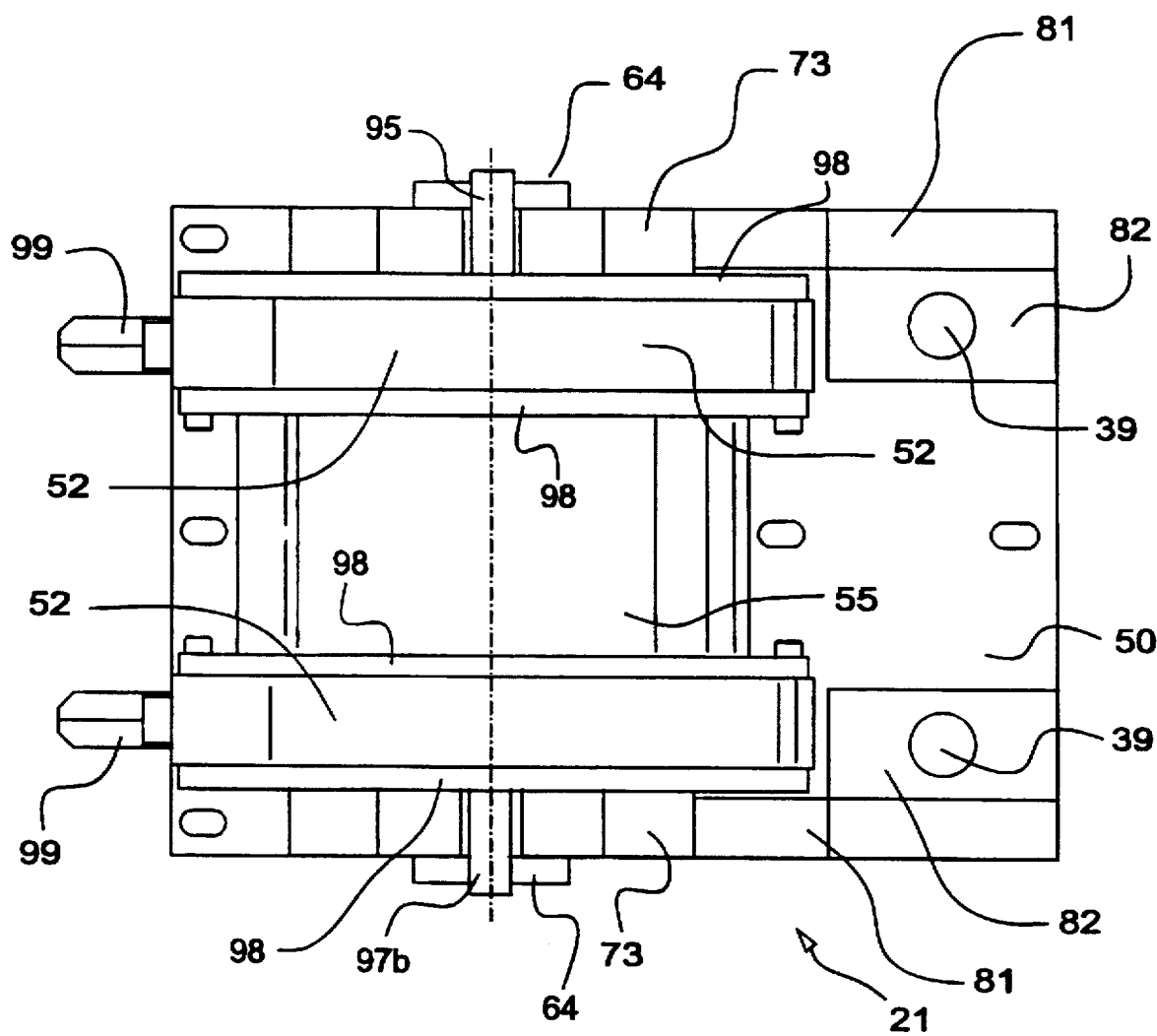
FIG. 16 is a top plan view of the fully assembled laser pump supported on a base plate and housed in a protective inert atmosphere.

In accordance with this invention a laser rod 20 may be pumped by a pump head 21 having a configuration as generally illustrated in FIGS. 1, 2 and 16. Thus laser rod 20 may be fitted within an annular cooling tube 16 extending between a pair of first cooler sealer plates 71.71. A pair of second cooler sealer plates 72.72 and a pair of third cooler sealer plates 73.73 are stacked against first sealer plates 71.71. Each of third cooler sealer plates 73.73 has a pair of passages 37.37 for connection to a pair of passages 38.38 in an associated one of a pair of first water manifolds 81.81 (see FIGS. 11, 12 and 17). Passages 38.38 of each first water manifold 81 are connected to a chamber 83 which exchanges cooling water with an input/output port 39 of a second water manifold 82. Also extending between first cooler sealer plates 71.71 are four cooling blocks 30.30.30.30, symmetrically arranged at 90 degree angles about the axis of cooling tube 16. Cooling blocks 30 are provided with longitudinally extending flow passages 32 and are positioned against four equiangular banks 10.10.10.10 of diode bars 15. Diode bars 15 are placed in close proximity to the outer surface of cooling tube 16 for excitation and illumination of the laser rod interior (assuming about 40° pump diode divergence). Diode bars 15 are positioned in such a manner as to excite a 30 mm core of a 4 mm rod in overlapping patterns which, in composite, approximate a cylinder. As much as 80% of the energy emitted by the diodes is radiated into this cylindrical pumping region.

Figure 25:
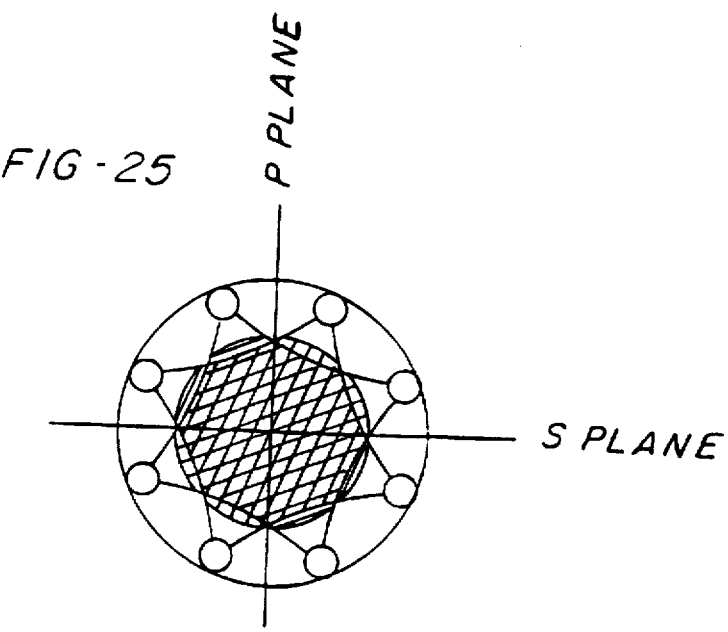
FIG. 25 is a composite of the combined beams of FIGS. 23 and 24, where the laser heads of FIGS. 18 and 20 are multiplexed optically one to the other, and also showing the combined intensity pattern in relation to the P plane and the S plane.

The mode of excitation is axially offset from the P and S axes as shown in FIG. 25, and two or more heads, according to this invention, may thus be multiplexed optically one relative to the other, further enhancing uniform core lasing of the multiplexed heads.

The laser pump head of this invention uses an Nd:YAG laser rod and is designed to provide symmetrical high power optical pumping. The head utilizes a series of 808 nm diode laser bars 15 in a quad bank, dual axis, transverse pumping arrangement as above described. This pumping arrangement provides the head with the ability to couple high pump power from laser diodes into an Nd:YAG rod and uniformly excite the rod's central region.

The head is designed to maximize the following parameters:

(a) Pumping Symmetry
(b) Maximum Cooling Capacity
(c) Diode Laser Thermal and Electrical Protection
(d) Ability to utilize multiple laser heads in a single laser system A primary concern is the pumping symmetry. For optimum performance of solid state laser materials such as Nd:YAG, the excitation must be as uniform as possible. This requirement is due to the optical properties of the laser material. Nd:YAG for example, exhibits a significant amount of thermally induced lensing and thermally induced birefringence. These two effects can be detrimental to the optimum performance of the laser. To reduce the effects of thermal lensing and birefringence, or at least make them more manageable, pumping symmetry is required.

Figure 4A:
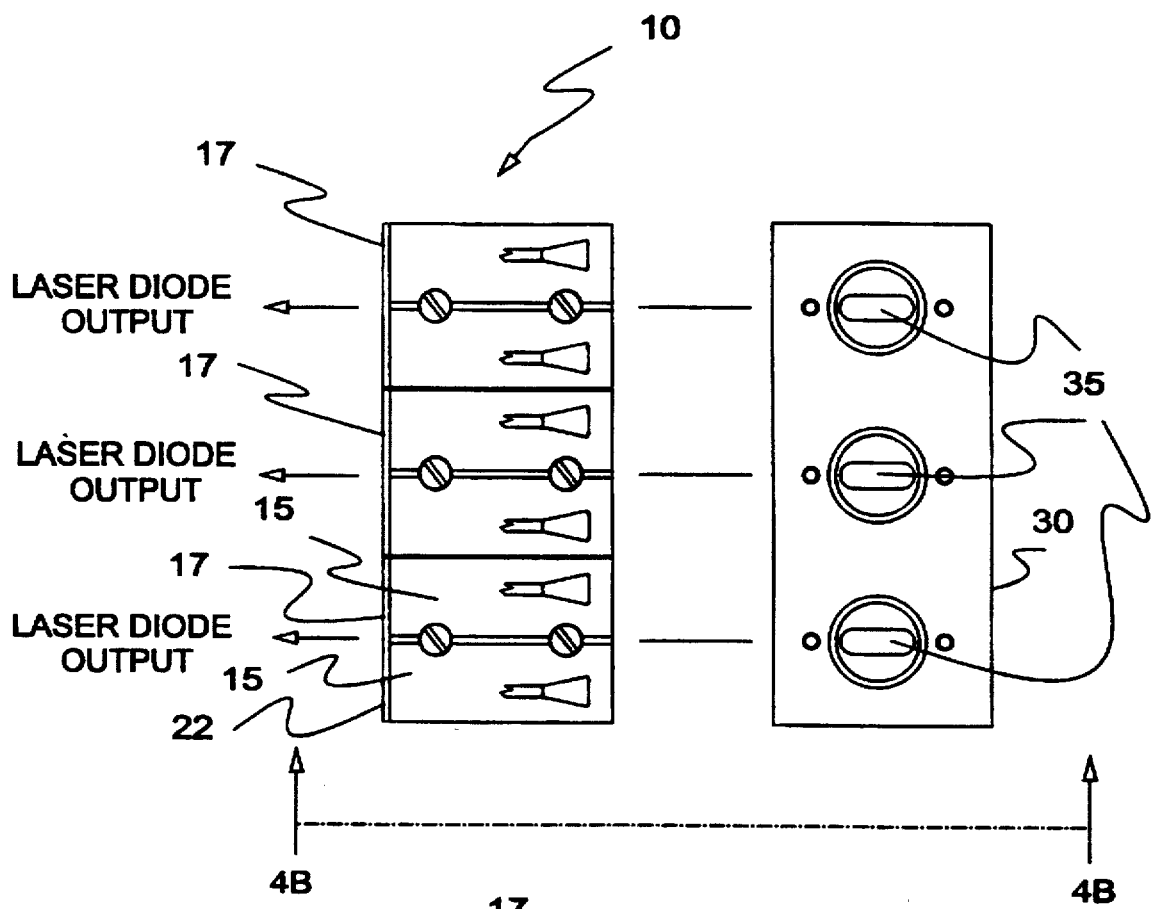
FIGS. 4A and 4B are schematic illustrations of the assembly of a cooling block against a diode bar.
Figure 23:
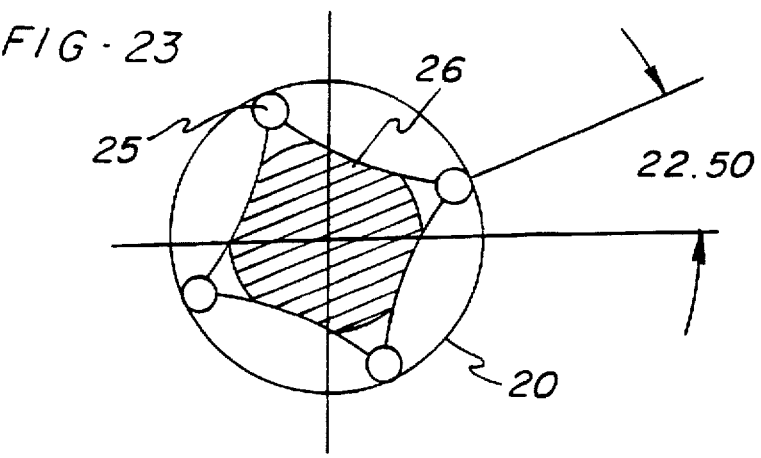
FIG. 23 is a composite diagram showing the intensity pattern in the laser rod of the two pairs of orthogonally arranged intersecting beams from a laser head which is oriented in the position shown in FIG. 18.
Figure 24:
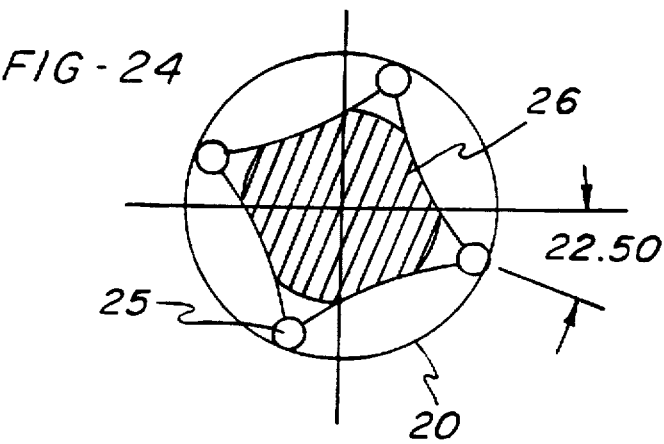
FIG. 24 is an intensity pattern similar to that of FIG. 23 but showing the orientation of the pattern utilizing the laser head oriented in the position of FIG. 20.

Each of banks 10 comprises six diode bars 15. This makes a total of 24 diode bars used in the head. The axis of a laser rod 20 is oriented along the z-axis and the diode banks are oriented at 45°, 135°, 225° and 315° with respect to the y-axis. As best illustrated in FIG. 4A, each diode bank 10 comprises three diode blocks 17 and each diode block 17 comprises two diode bars 15. The blocks 17 also function as heat sinks for their associated diode bars 15. The pump light from each diode block 17 overlaps the pump light from the adjacent blocks. This allows for at least 2.77" or approximately 70 mm of an 80 mm rod length to be continuously illuminated from four sides. See FIGS. 22–25. The four diode banks 10,10,10,10 combine to form two orthogonal axes of pumping symmetry. The pumping symmetry allows the diode light from the four sides effectively to combine and uniformly pump the central approximately 3 mm core of the 4 mm diameter laser rod 20, as illustrated in FIGS. 23 and 24.

Figure 22:
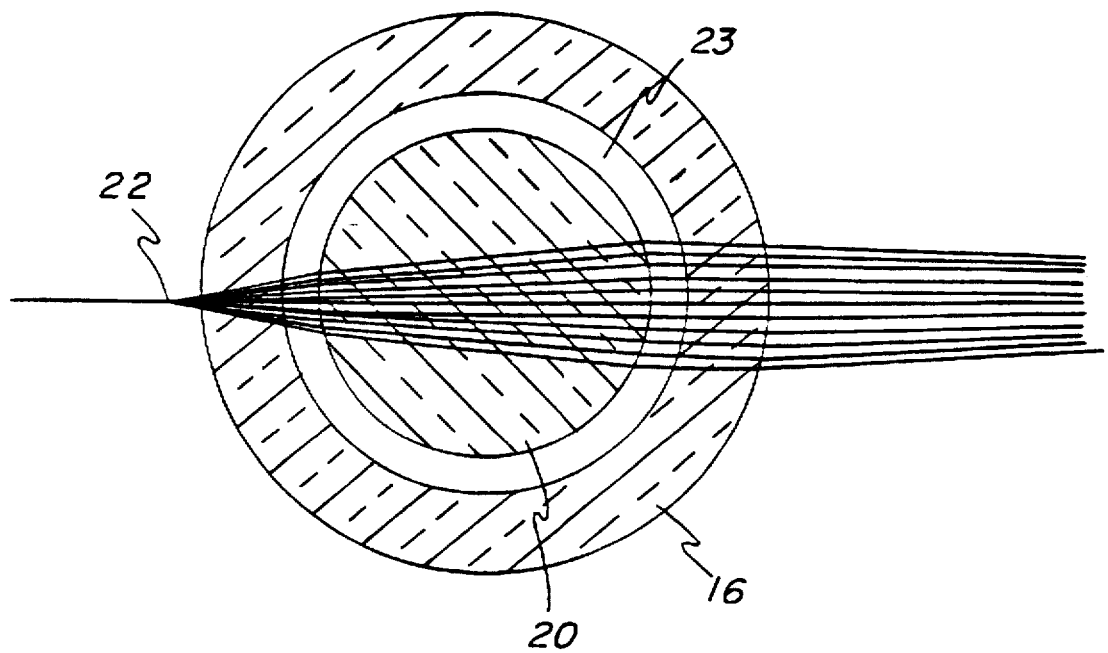
FIG. 22 is a diagram illustrating the propagation of rays emanating from a diode bank through the cooling water tube and the laser rod, from one bank of diodes only, and showing the bending induced by the curvature of the tube.

The positioning of diode bars 15 relative to cooling tube 16 is illustrated in FIG. 22. The emitting point from the diodes is represented at the point 22 and this point may be adjustable and resettable to between 150 and 250 microns from the adjacent surface of the tube 16. In addition, the annular space 23 defined between the inside diameter of the tube 16 and the outside diameter of the rod 20 is held to a minimum. In this instance, the radius of the annulus 23 may be ½ mm for a 4 mm diameter rod 20. Such a small space for water cooling is feasible since only about 30% of the input electrical power is coupled into the laser rod by optical pumping. Special care has been taken to inject the cooling water under a turbulent flow condition, which flow condition is maintained throughout the length of the annulus 23, in the axial space between third cooler sealing plates 73,73 as shown in FIG. 1.

This arrangement thus allows the major portion of the illumination energy to enter the side of the rod 20. The pattern formed by this entry, as illustrated in the example of FIG. 23, forms a necessary hot spot 25 immediately at the point of entry and a composite pattern 26 which simulates a circle substantially in the inner 3 mm diameter of the 4 mm rod.

In addition to the pumping symmetry, further pumping efficiency is achieved by the use of a cooling tube 16 which is manufactured from fused silica crystal or HEM sapphire. While the primary function of the cooling tube 16 is to channel cooling water across the laser rod, it performs an important secondary function in collimating the diode pump light.

The output light from each diode bar diverges rapidly as shown in FIG. 22. By utilizing the cylindrically shaped water tube, the tube itself becomes a positive cylindrical lens. Thus, it tends to reduce the divergence of the diode pump beam in the vertical axis. By reducing the divergence, more of the pump beam is coupled into the central core region of the Nd:YAG rod. The choice of the water tube material is based on the amount of divergence compensation required in the head. This enables the head to accommodate pump diodes from different diode manufacturers.

One could further reduce the divergence of the pump beam by utilizing an actual lens in front of the pump diode. This additional lensing, however, can cause the pump beam to focus and thus cause "hot" spots in the laser rod. By using only the water tube as a lens it becomes practical to increase the light coupling into the central portion of the rod while not generating "hot" spots in the rod.

As an additional measure, cooling tube 16 is coated with an anti-reflection coating along the axes of light injection. This coating reduces the amount of pump light that is reflected back towards the pump diodes thus, reducing optical losses in the pumping process.

Cooling is also a major design concern. To help reduce the thermal lensing and birefringence effects in laser rod 20, the rod must be properly cooled. Cooling is also required for diode bars 15. Each pump diode used in pump head 21 head may be driven by 18 amps electrical current, D.C. The voltage drop across each diode is approximately 2.1 to 2.3 volts. To find the power input to each diode we can use the following equation:

$$\begin{aligned} \text{Power} &= \text{(current) (voltage)} \\ &= \text{(18 amps) (2.3 volts)} \\ &= 41.4 \text{ watts/diode} \end{aligned}$$

Thus for the total power:

$$\begin{aligned} \text{Power} &= (41.4 \text{ watts}) (24 \text{ diodes}) \\ &= 993.6 \text{ watts} \end{aligned}$$

So, the total electrical power that is input to the 24 diodes can be about as high as 1000 watts (1kW). The optical power produced by the pump diodes driven at a current of 18A is approximately 12.5 watts per diode bar. Therefore, the total optical power produced by the 24 diode bars 15 is approximately 300 watts.

Figure 17:
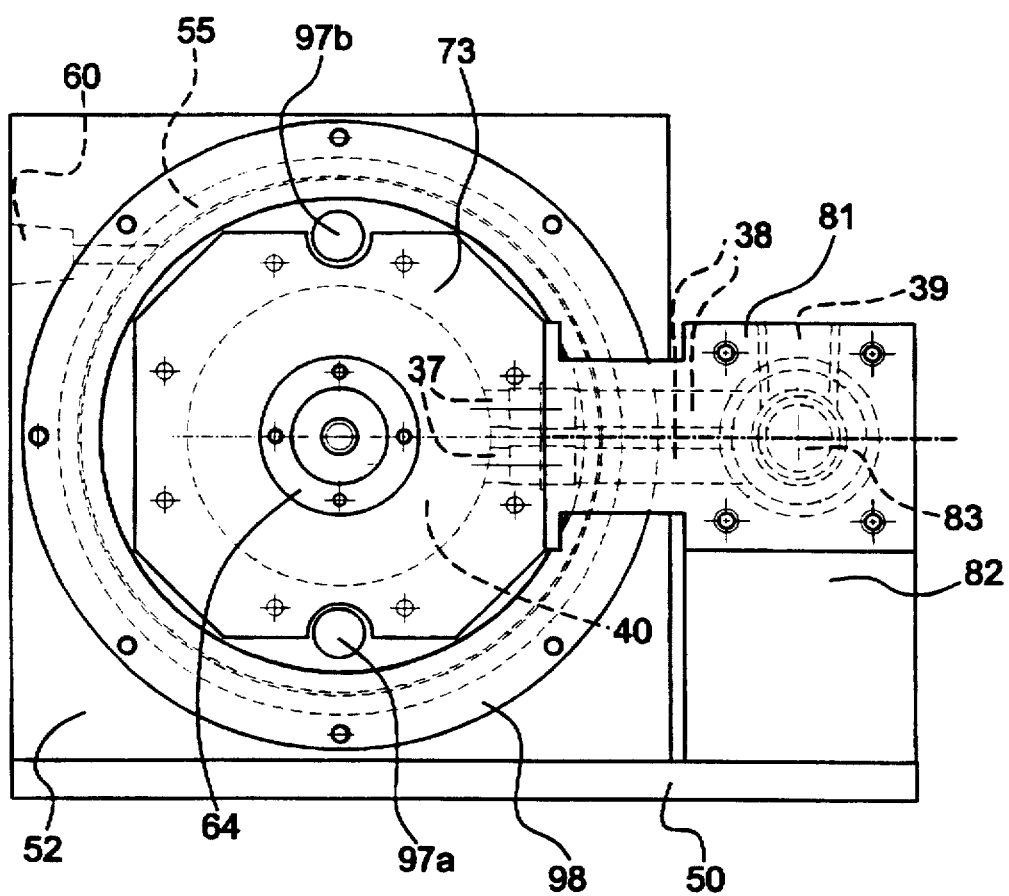
FIG. 17 is a rear elevation view of the fully assembled laser pump head in a first angular orientation.
Figure 26:
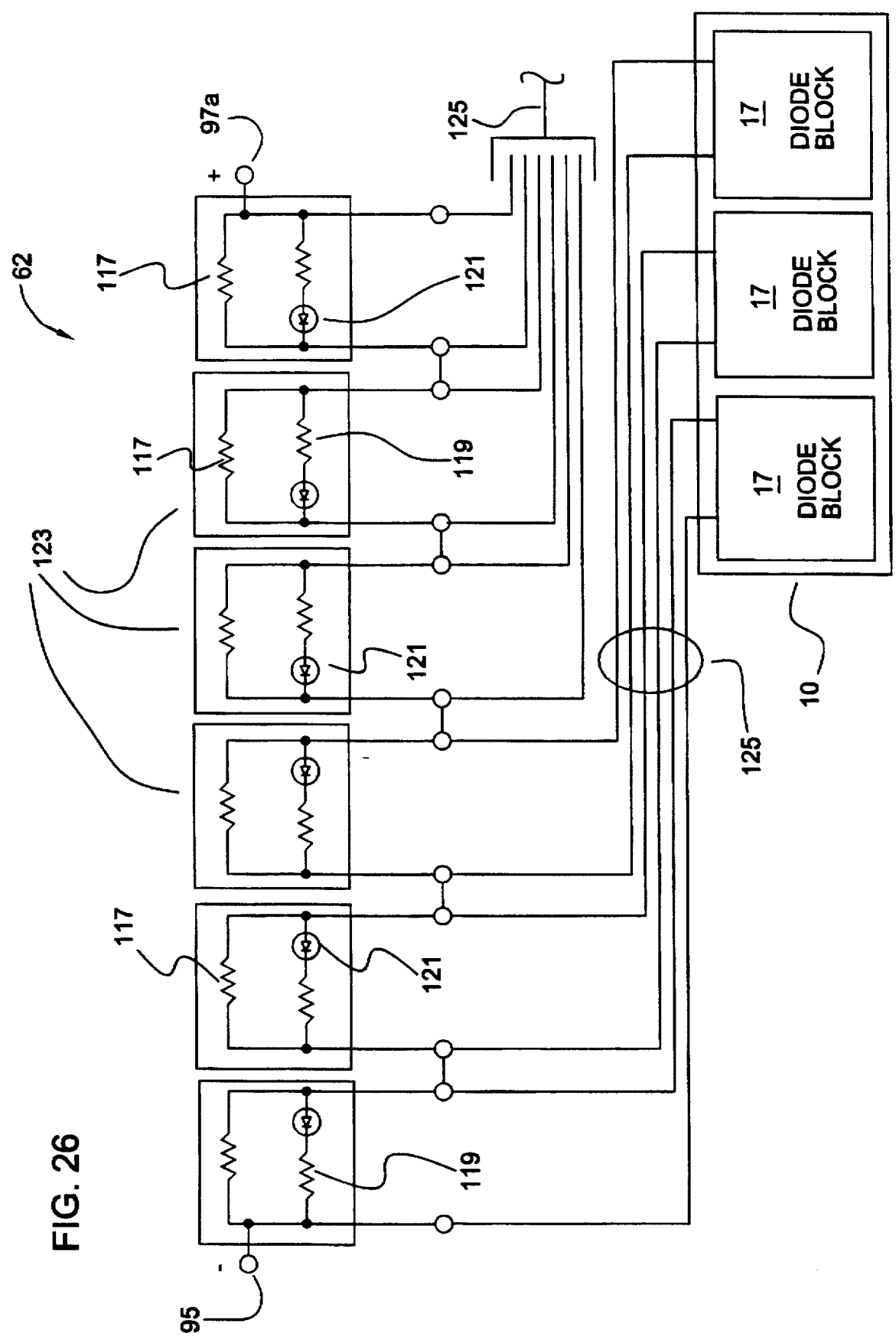
FIG. 26 is a schematic diagram of a power supply for driving two banks of laser diodes.

FIG. 26 illustrates preferred circuitry 62 for driving the pump diodes. Two such circuits are employed, each having a pair of output cables 125,125 for driving two banks of pump diodes 10,10 Each diode block 17 (comprising two diodes per block) has a pair of power leads which are connected via one of the cables 125 to solder terminals on a printed circuit board supporting one of the circuits 62. Each circuit 62 comprises six networks 123 which are connected in series. Moreover, the two circuits 62 are in series with each other. The circuit 62 illustrated in FIG. 26 is connected to a power supply terminal 97a which receives a supply current of positive potential from an AC rectifier (not illustrated). The illustrated circuit 62 terminates at a connection terminal 95, which is connected by a jumper cable to another such terminal 95 (visible on FIG. 16). The second terminal 95 is connected for driving the second circuit 62 (not illustrated), which terminates at a negative power supply terminal 95b (FIG. 17). Each network 123 comprises a resistor 117 in parallel with the series combination of an LED 121 and another resistor 119.

Figure 4B:
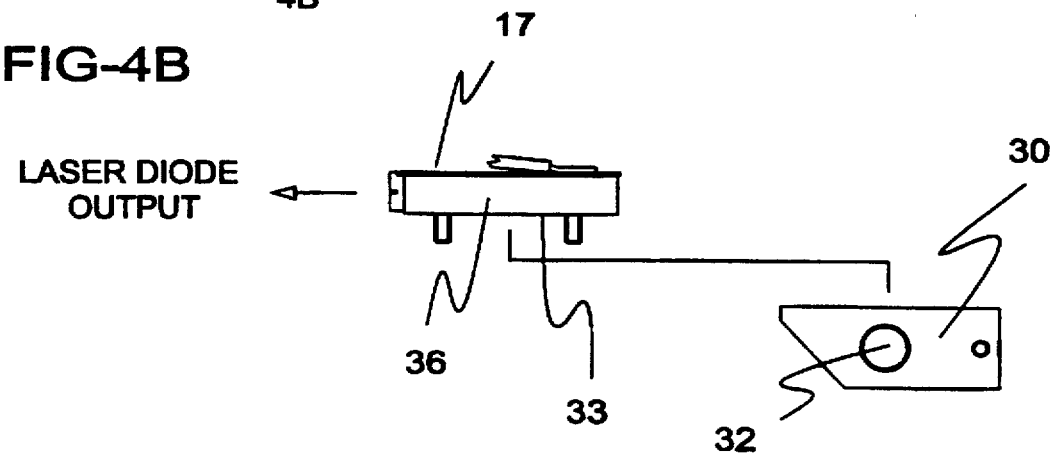
Figure 5:
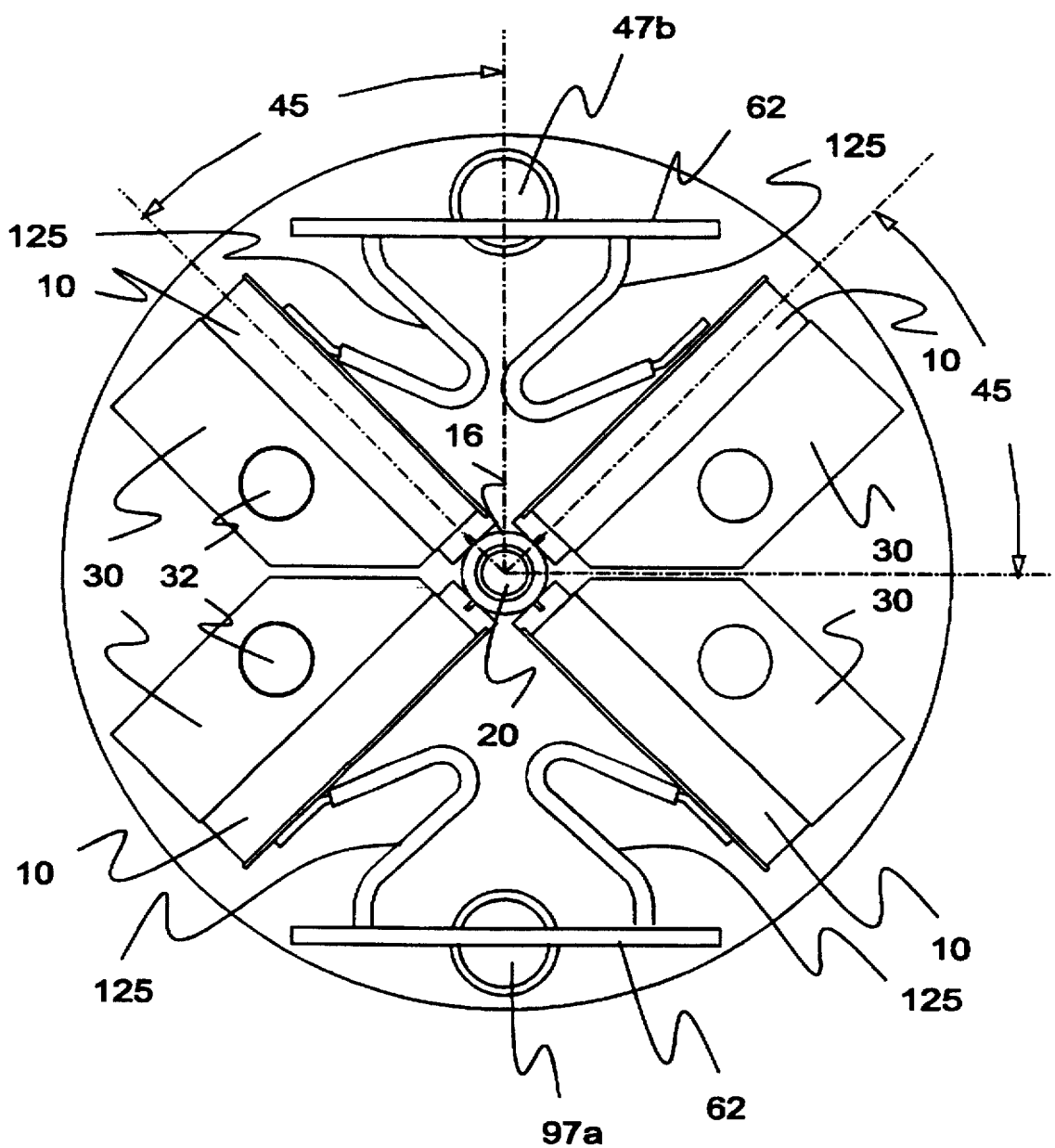
FIG. 5 is an end view of four diode bars assembled against four cooling blocks in orthogonal relation to each other and surrounding a fused silica cooling tube.

The preferred diodes used with this invention are those supplied by Opto Power Corporation, 3321 East Global Loop, Tucson, Ariz. 85706. A preferred source of laser bars in which the diodes are mounted in the pairs, as illustrated in FIGS. 4A and 4B, is Laser Diode Array, Inc., 500 Metcalf Plaza, Auburn, N.Y. 13021 and made according to U.S. Pat. Nos. 5,040,187 and 5,128,951 of Karpinski.

The laser head is designed to remove the heat caused by the combination of approximately 1kW of electrical and optical power dumped into the system. The heat is removed by flowing water at low heads or pressure drop. The water throughput in pump head 21 is 2.2 gal/min. at a pressure of 3 psi. When the pump diodes are driven at 18 amps of electrical current, the water flowing through the laser head will see an average increase in temperature of approximately 1° C.

Figure 6:
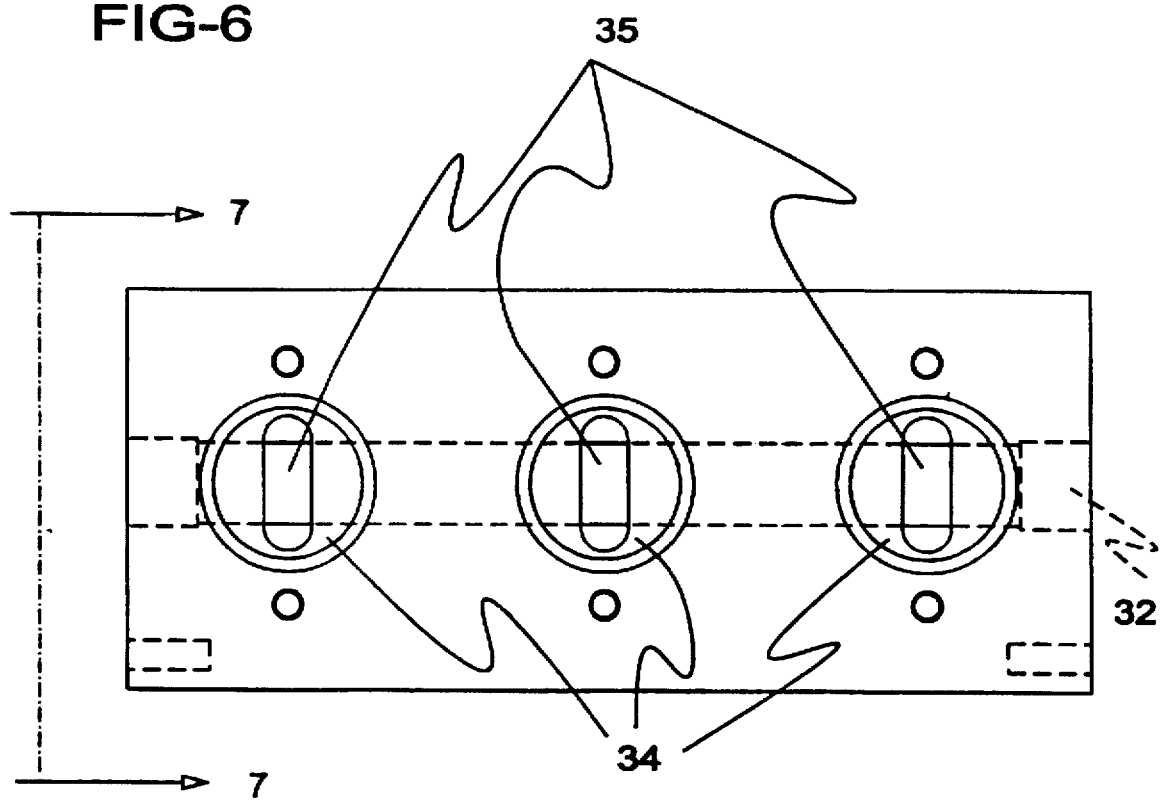
FIGS. 6 is a plan view of a cooling block looking into sidewardly directed water passageways and showing flow diverter blocks therein.

The symmetry of the construction particularly with regard to components for directing flow of cooling water and the flow patterns themselves may best be understood by referring to FIGS. 1–3, 6–15 and 17. Referring first to the exploded view of FIG. 3, the principal components for cooling include four identical diode mounting and cooling blocks 30. The construction of the blocks 30 may be seen by reference to FIGS. 6 and 7.

Each cooling block 30 has a major, longitudinally extending, through passage 32 which supplies cooling water to three sidewardly extending passages 34,34,34. Each of passages 34 carries cooling water into contact with the rear face 33 of a heat sink body 36 which supports (and cools) an associated diode block 17. See FIG. 4B.

At each intersection of main passage 32 with a side passage 34, there is inserted a diverter block 35 of rectangular cross-section. The diverter block 35 extends partially into the passageway 32 and causes a part of the water flowing thereto to be directed into contact with a heat sink body 36. The water approaches face 33 from one lateral side of the block 35 and returns to the passageway 32 at the other lateral side. Under a pressure of 3 psi, the water is accelerated and moves rapidly into intimate contact with the adjacent heat sink surface of the diode bar without stagnation and under turbulent flow conditions.

Figure 7:
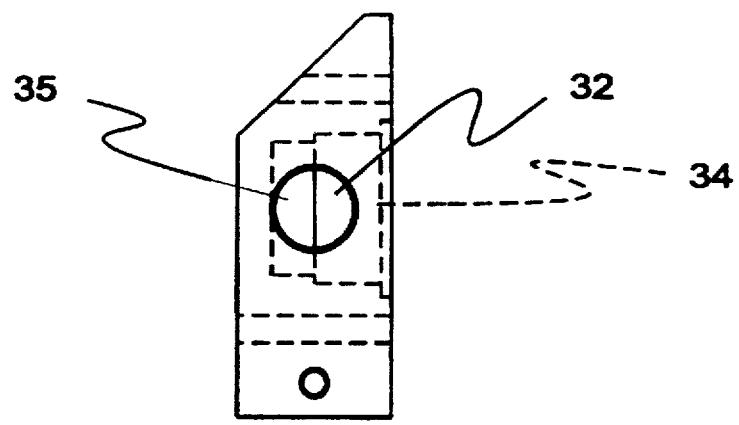
FIG. 7 is an end view taken along lines 7—7 of FIG. 6 and showing a main water passageway in the cooling block.
Figure 8:
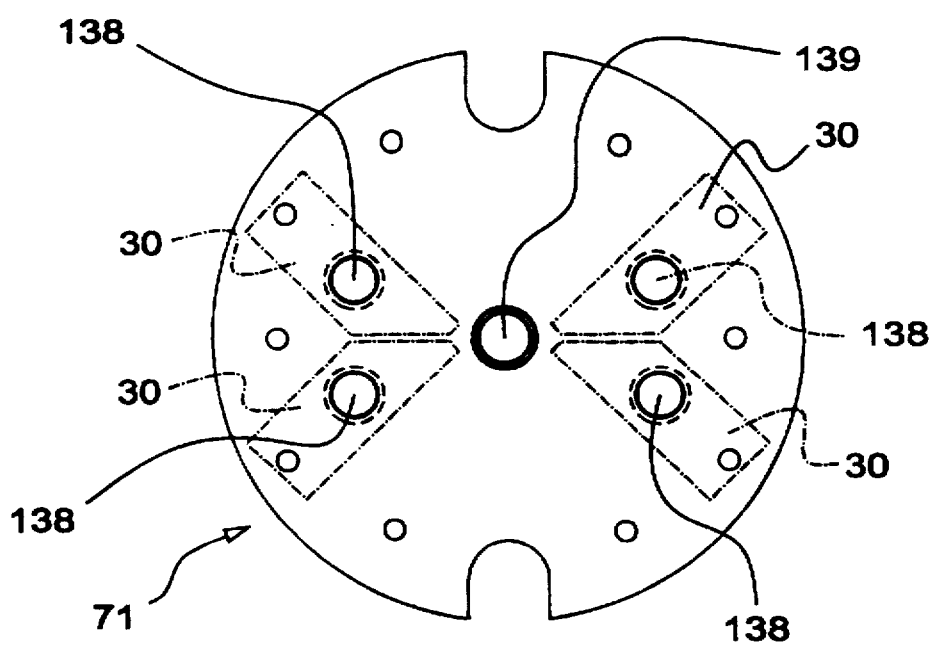
FIG. 8 is a front elevation view of a first cooler sealer plate, including phantom lines to illustrate the positioning of four cooling blocks thereagainst.

As shown in FIG. 7, the diverter blocks only partially intersect the major passageway 32 and thereby, a portion of the flow can bypass the intersecting opening 34 and pass to the next opening and in doing so, recombine with water which is returning from the exposed face of the heat sink body 36. In this manner, better mixing is provided, and the diode banks can be maintained at a more uniform temperature.

It should be clear that the water cooling system has end-to-end bilateral symmetry and that all components are reversible. Thus the cooling system has a water supply end and a water discharge end which use interchangeable parts and which are mirror images of each other. Looking at it in the direction of water flow, the supply end comprises a second water manifold 82, a first water manifold 81, a third cooler sealer plate 73, a second cooler sealer plate 72 and a first cooler sealer plate 71. The following discussion will be limited to the supply end; it being understood that the discharge end is constructed and functions in a similar, albeit reversed, fashion.

Figure 3:
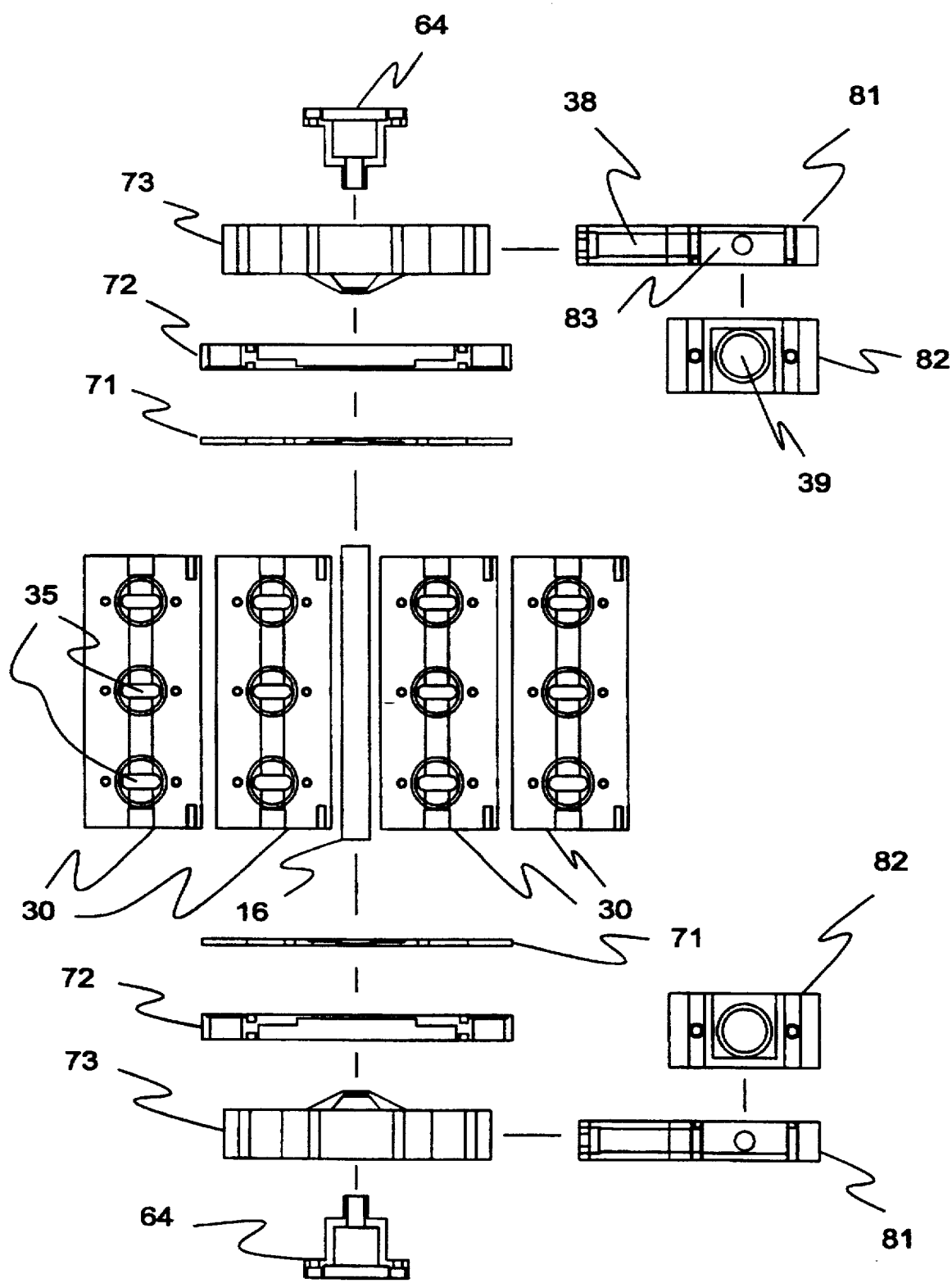
FIG. 3 is a laid-out view of components of the laser pump head which convey and circulate a flow of cooling water.
Figures 9, 10:
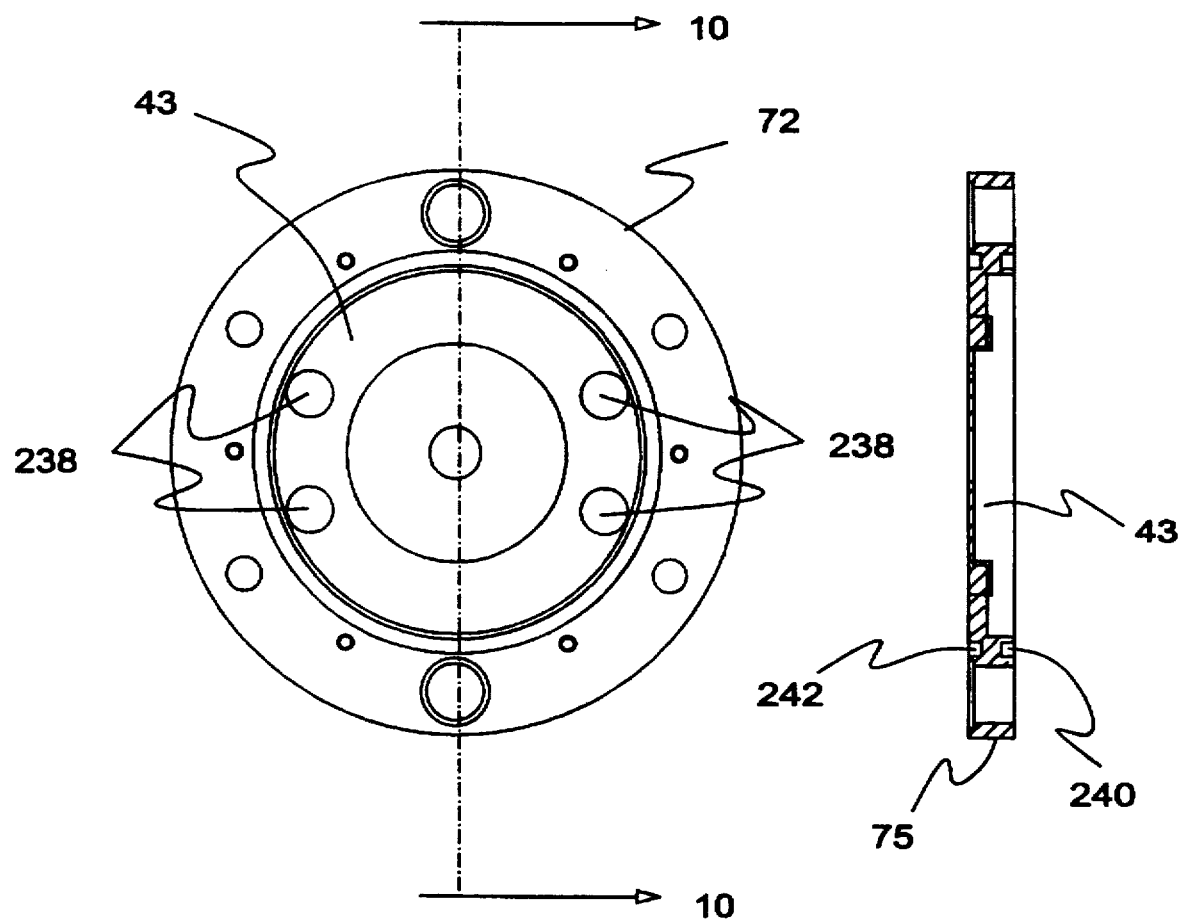
FIG. 9 is a front elevation view of a second cooler sealer plate showing the inside face thereof.
FIG. 10 is a crossection taken along lines 10—10 of FIG. 9.
Figure 13:
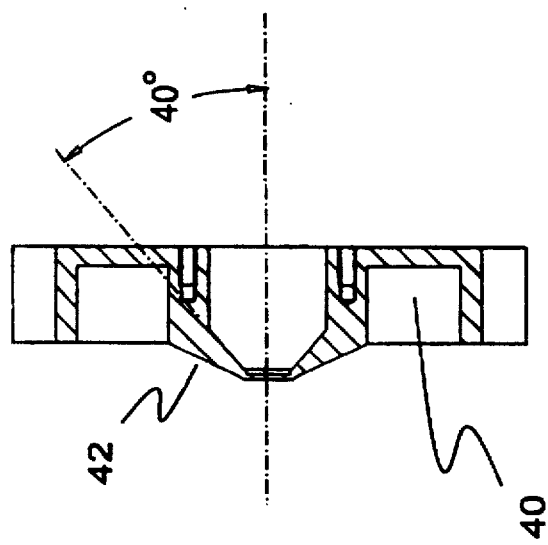
FIG. 13 is a crossection taken along lines 13—13 of FIG. 12.

Water is supplied to pump head 21 at a pressure which preferably may be about 3 psi. Preferably, also, the water is supplied by a ⅝ in. ID hose (not illustrated) connected to a passage 39 in second water manifold 82. The incoming water then is delivered to a chamber 83 in first water manifold 81 which is in fluid communication with a pair of parallel supply passages 38,38 (FIGS. 3 and 17). The cooling water flows from passages 38,38 of first water manifold 81 into a pair of passages 37,37 in third cooler sealer plate 73, and from there into a chamber 40 formed in the downstream face of third cooler sealer plate 73, (FIGS. 11–13) and closed out by the upstream face 43 of second cooler sealer plate 72. (FIGS. 9 and 10). The chamber 40 is the main water collection and distribution point for the head.

Once chamber 40 is filled, the water is sent directly into four ports 238 drilled into second cooler sealer plate 72, and through four apertures 138 drilled in first cooler sealer plate 73 in alignment therewith. See FIG. 8. As shown in phantom lines in FIG. 8, cooling blocks 30,30,30,30 are positioned against first cooler sealer plate 73 in alignment with apertures 138, so as to direct a flow of cooling water into the four passages 32 previously described.

Special provision is made by which the cooling water from chamber 40 is directed in a converging manner into the space between cooling tube 16 and laser rod 20 at an ever decreasing volume and increasing velocity from the chamber 40. This can best be seen by reference to FIG. 2 in which a conical surface 42 is formed on the downstream surface of the third cooler sealer plate 73. The cone 42 forms a converging passage with the adjacent radial upstream surface 43 of second cooler sealer plate 72. Laser rod 20 is positioned inside cooling tube 16 with the aid of an assembly tool comprising a flat metal plate 68 and a vertical post 69 which are inserted into the outward face of a rod sealer plate 64. (For details of rod sealer plate 64 see FIGS. 14 and 15.) The assembly is performed in an endwise vertical direction with the metal plate 68 fixed to a work bench 66.

A small aperture is formed at the cone apex which engages and centers the end of the laser rod 20. The rod passes through third cooler sealer plate 73 and is sealed against the outwardly facing surface thereof by an O-ring 44 which is pressed into place by rod sealer plate 64. The laser rod itself is thus supported only at its ends at the aperture in the cone 42 and by O-rings which are located at positions where they will not be subject to degradation by the light within the tube 16.

Cooling tube 16 is sealed at the center aperture in the second cooler sealer plate 72, by an O-ring 45. Second cooler sealer plate 72 supports the tube 16 in accurate relation to the rod 20, thereby defining a true annulus 23 therebetween which opens at the axial ends into the space between second cooler sealer plate 72 and third cooler sealer plate 73. Cooling tube 16 terminates immediately upon entry into this space, thereby defining a nozzle-like gap 48. Pressurized cooling water enters gap 48 and is forced radially inward toward annulus 23. The water enters the annulus 23 against the exterior wall of laser rod 20 in a turbulent flow condition, which flow condition is maintained throughout the length of the rod within the tube. This ensures that the cooling water contact with the rod is sufficient to remove 300 watts of optical pump power without causing unwanted vibrations or distortions of the laser rod.

After the cooling water has passed through the diode cooling blocks 30 and cooling tube 16, it exits the system. As stated above, the cooling water exits via an arrangement of discharge passages which mirror the entry passages. This includes chambers 40 and 83 which provide any required expansion for accommodation of pressure surges.

Figure 18:
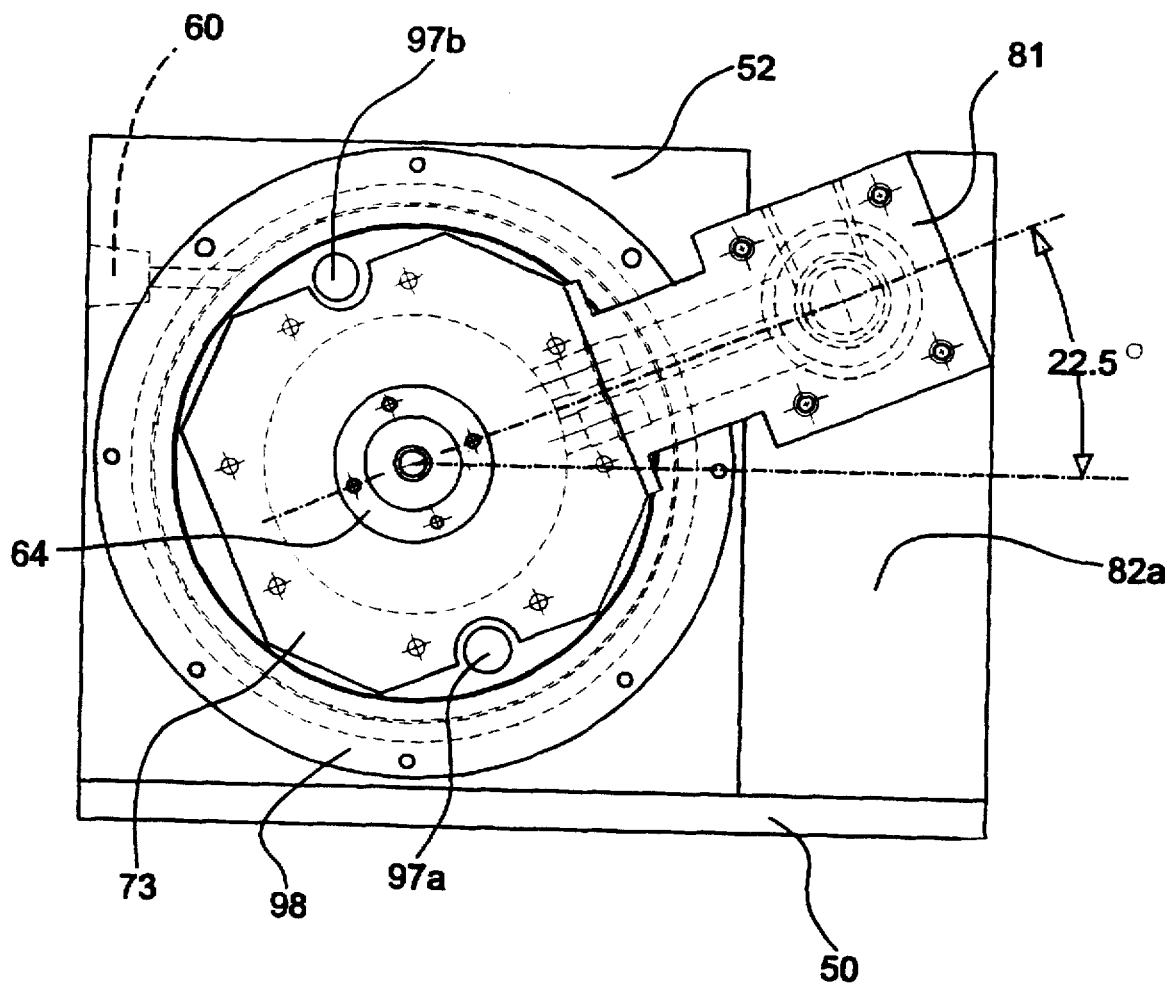
FIG. 18 is a rear elevation view of a fully assembled laser pump head in a second angular orientation.
Figure 19:
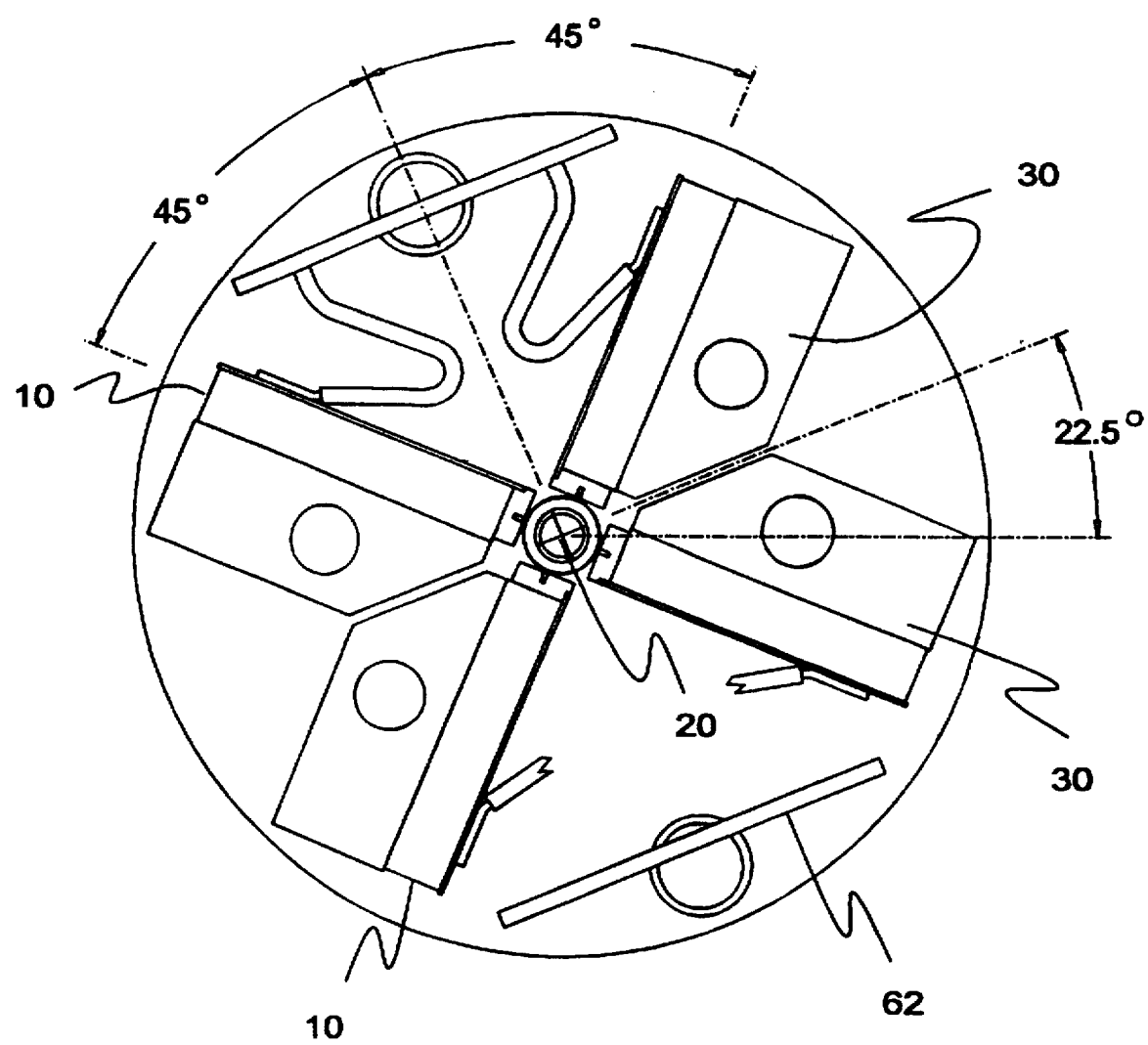
FIG. 19 is a schematic illustration of an internal diode arrangement for use in a laser pump head oriented as shown in FIG. 18.
Figure 20:
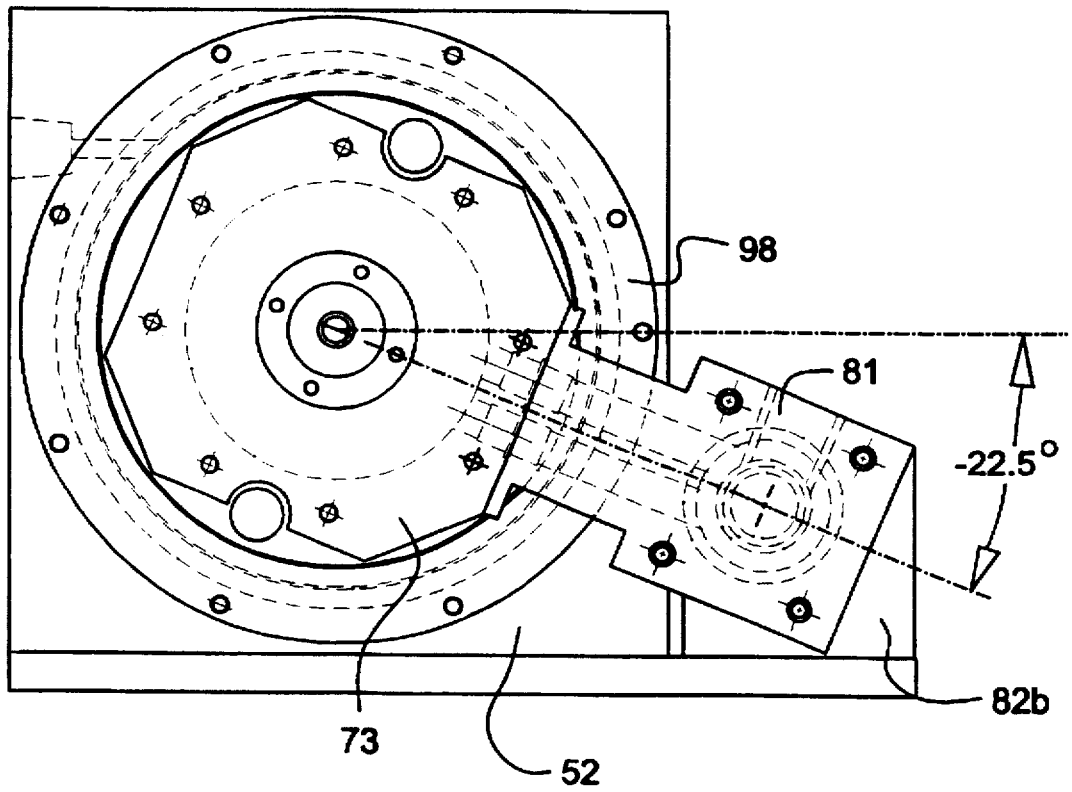
FIG. 20 is a rear elevation view of a fully assembled laser pump head in a third angular orientation.
Figure 21:
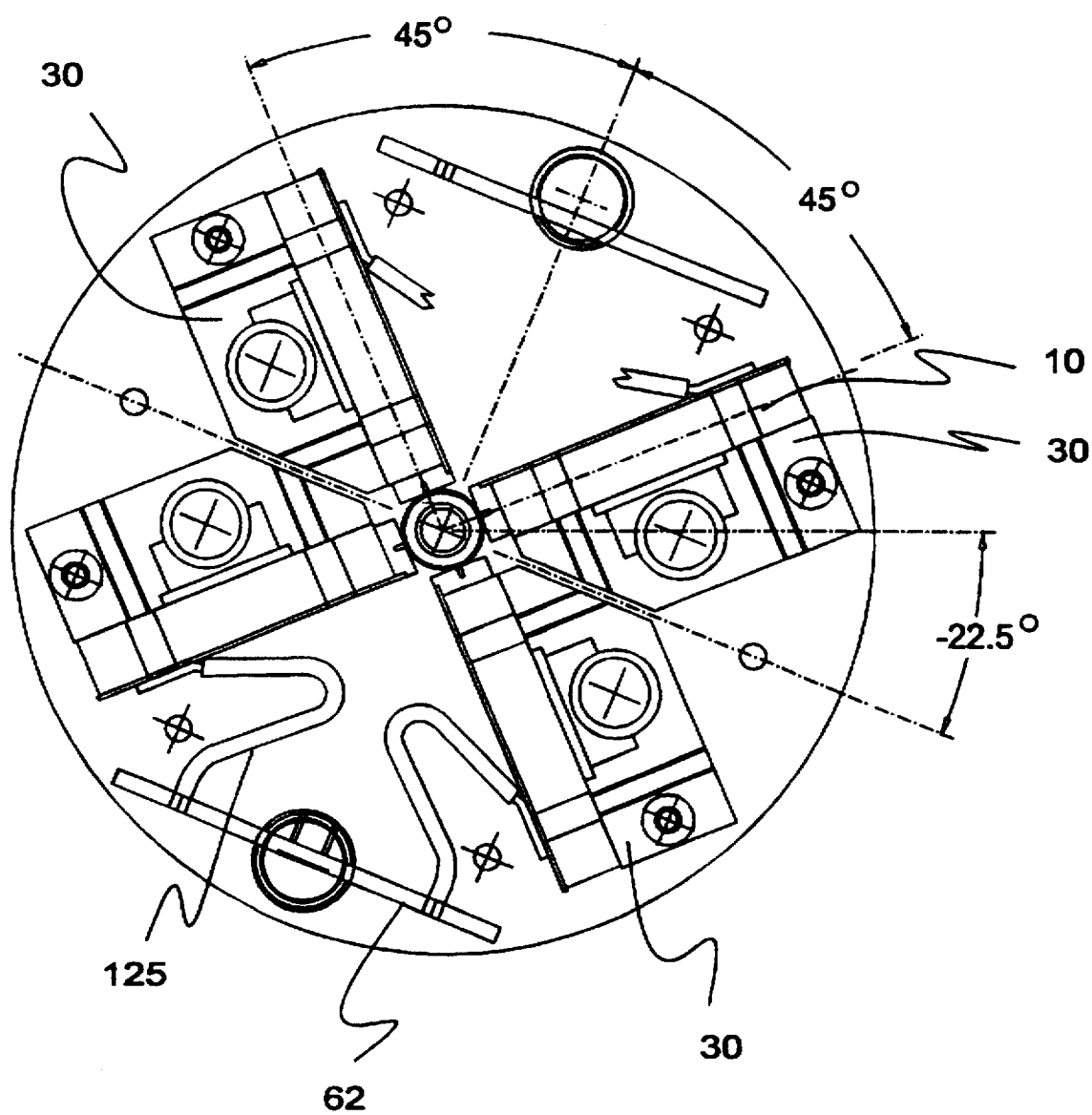
FIG. 21 is a schematic illustration of an internal diode arrangement for use in a laser pump head oriented as shown in FIG. 20.

As best seen in FIGS. 16 and 17, the assembled pump head 21 is supported inside a vacuum sleeve 55 extending between a pair of vacuum bulkheads 52,52 and sealed thereagainst by two pairs of sealing rings 98,98,98,98. The inside surface of vacuum sleeve 55 receives the outer peripheral surface 75 (FIG. 10) of second cooler sealer plate 72. Vacuum bulkheads 52,52 in turn are secured to a base plate 50. Vacuum sleeve 55 may be made of scientific grade Pyrex or quartz glass, and is sealed by O-ring seals against vacuum bulkheads 52,52. The entire head assembly may be angularly rotated within the vacuum bulkhead assembly, and the rotated or angular position is defined by the elevation or height of second water manifold 82. This angle may be changed by modifying the configuration of the second water manifolds 82,82, as shown in FIGS. 18 and 20 for alternative embodiments (82a and 82b). This establishes and maintains a defined axis of the laser head with respect to the plane of base plate 50.

Each of vacuum bulkheads 52,52 is provided with an exhaust passage 60 exteriorly connected to a fitting 99 for evacuating the space inside vacuum sleeve 55 and surrounding the pumping diodes. The assembly is flushed with nitrogen for one hour while the diodes are turned on to 100 watts output. After one hour the vacuum chamber is sealed at the vacuum bulkheads. The nitrogen flushing removes moisture contaminated air from the head and thus prevents any condensation from forming on the pump diodes which could cause unwanted short circuits. This allows for a wider range of input cooling water temperature to be used in the head.

A further feature of laser pump head 21 is its suitability for multiplexing with other similarly constructed pump heads More specifically, the head is designed so as to enable improved pumping symmetry when used in a series arrangement to generate a laser beam. This is achieved by rotating the heads about the z-axis in the manner described above and as shown in FIGS. 18–21. By simply replacing second water manifold 82 with the modified manifold 82a the pump axes can be shifted by −22.5°, or by +22.5°. Thus, for two heads placed in series (optically) the total combined pump axes are increased from two to four and if three heads are used in series (optically) the total combined pump axes goes from four to six. It has been found that by using multiple heads, and therefore, more axes of pumping, the effects from thermal lensing and thermally induced birefringence are greatly reduced. Thus one head tends to compensate for the other.

It will be appreciated that the laser head of this invention is characterized by a superior cooling arrangement by which diode banks are maintained in a constantly cooled condition, even when operated in the continuous wave mode and in which the maximum temperature rise may be carefully controlled, to extend the life of the diodes and to provide a constant and stable output. The invention is further characterized by a cooling arrangement which uses relatively low water pressure to achieve a high rate of flow of water therethrough, thereby to maintain a turbulent flow condition over the diode mounting and heat sink plate surfaces and within the crystal tube which encases the laser rod.

The invention is also characterized by a laser head which has total symmetry in its parts, using interchangeable parts and therefore parts which may be assembled without regard to which end of the head they are placed. Even the diode bank mounting and cooling blocks are identical and interchangeable.

What is claimed is:

1. Apparatus for pumping a cylindrical laser rod extending along a rod axis for a rod length at a constant rod diameter, said apparatus comprising:

(a) a hollow, transparent tube extending along a tube axis for a tube length approximately equal to said rod length, said tube having an inside diameter slightly larger than said rod diameter and an outside diameter slightly larger than said inside diameter;

(b) Support means for supporting said laser rod inside said tube such that said tube axis is coincident with said rod axis, thereby defining an uniform crossection annular passage between said laser rod and said tube;

(c) a multiplicity of laser diodes directed toward said laser rod and arranged closely adjacent said tube in a plurality of symmetrically positioned banks extending parallel to said tube axis and said rod axis;

(d) means for applying electrical power to said laser diodes, so that said laser diodes generate beams of illumination which pass through said tube and said annular passage for side pumping said laser rod; and (e) circulation means for cooling said laser rod by circulating a flow of a cooling fluid through said annular passage.

2. Apparatus according to claim 1, said circulation means comprising means for circulating said cooling fluid into cooling relation with said laser diodes.

3. Apparatus according to claim 2 further comprising a plurality of heat sink bodies supporting said banks of laser diodes and absorbing heat therefrom.

4. Apparatus according to claim 3 wherein said circulation means comprises a plurality of cooling blocks provided with passages for conveying flows of said cooling fluid, said cooling blocks being positioned in contact with said heat sink bodies.

5. Apparatus according to claim 4, said cooling blocks each being provided with a major through passage and a plurality side passages connected thereto, said side passages being open against said heat sink bodies.

6. Apparatus according to claim 5, said circulation means further comprising a plurality of diverter blocks positioned at intersections of said through passage and said side passages for directing said cooling fluid along round trip paths from said through passage, into said side passages and turbulently against said heat sink bodies without fluid stagnation.

7. Apparatus according to claim 1, said circulation means comprising means defining a nozzle-like approach to said annular passage for producing turbulence in said flow of cooling fluid.

8. Apparatus according to claim 1, said laser diodes having emitting surfaces which are spaced from the surface of said cooling tube by a distance which is in a range between about 150 and 250 microns.

9. Apparatus according to claim 8 wherein said cooling tube has a surface coating of anti-reflectance material.

10. Apparatus according to claim 9 wherein said cooling tube is made of fused silica.

11. Apparatus for pumping a cylindrical laser rod comprising: four banks of laser diodes facing said laser rod and arranged along lines extending parallel thereto, said banks of laser diodes being symmetrically positioned about said laser rod at mutually orthogonal angles and at a radial distance such that said laser diodes generate overlapping illumination patterns for side pumping said laser rod; and a power supply for said laser diodes.

12. Apparatus according to claim 11, further comprising a cooling system for said laser rod and said laser diodes.

13. Apparatus according to claim 12 wherein said cooling system comprises sink bodies positioned against non-emitting surfaces of said laser diodes, a cooling tube annularly surrounding said laser rod, and circulation means for circulating a liquid cooling fluid through said cooling tube and against said sink bodies.

14. Apparatus according to claim 13 wherein said circulation means comprises symmetrically arranged sets of interchangeable fluid supply components and fluid discharge components.

15. Apparatus according to claim 14, further comprising a vacuum sleeve surrounding said laser rod, said banks of laser diodes and said circulation means; and means for creating a controlled atmosphere inside said vacuum sleeve.

16. Apparatus according to claim 15 wherein said banks of laser diodes each comprise a plurality of laser bars, each laser bar comprising a multiplicity of laser diodes, and said laser bars being organized into blocks which are separately connected to said power supply.

17. Apparatus according to claim 16 wherein said laser bars comprise 808 nm laser diodes.

18. Apparatus according to claim 15 wherein said laser rod, said banks of laser diodes and said circulation means are joined as a unit which is angularly positionable inside said vacuum sleeve.

19. Apparatus for pumping a cylindrical laser rod extending along a rod axis for a rod length at a constant rod diameter, said apparatus comprising:

(a) a hollow, transparent tube extending along a tube axis for a tube length approximately equal to said rod length, said tube having an inside diameter slightly larger than said rod diameter and an out side diameter slightly larger than said inside diameter;

(b) Support means for supporting said laser rod inside said tube such that said tube axis is coincident with said rod axis, thereby defining an uniform crossection annular passage between said laser rod and said tube;

(c) four banks of laser diodes facing said laser rod and arranged along lines extending parallel thereto, said banks of laser diodes being symmetrically positioned about said laser rod at mutually orthogonal angles and at a radial distance such that said laser diodes generate overlapping illumination patterns for side pumping said laser rod;

(d) means for applying electrical power to said laser diodes, so that said laser diodes generate beams of illumination which pass through said tube and said annular passage for side pumping said laser rod; and (e) circulation means for cooling said laser rod by circulating a flow of a cooling fluid through said annular passage.

* * * * *